(12) United States Patent
Kuan et al.

(10) Patent No.: US 7,072,016 B2
(45) Date of Patent: Jul. 4, 2006

(54) METHOD FOR RUBBING LCD SUBSTRATE

(75) Inventors: Da-Shuang Kuan, Hsinchu Hsien (TW); Yi-Cheng Lan, Chiayii Hsien (TW); Sheng-Lung Chen, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 212 days.

(21) Appl. No.: 10/817,581

(22) Filed: Apr. 2, 2004

(65) Prior Publication Data

US 2004/0198182 A1 Oct. 7, 2004

Related U.S. Application Data

(62) Division of application No. 10/065,976, filed on Dec. 5, 2002, now abandoned.

(51) Int. Cl.
*G02F 1/1337* (2006.01)

(52) U.S. Cl. ...................................................... 349/126

(58) Field of Classification Search ................. 349/126, 349/123, 187
See application file for complete search history.

(56) References Cited

U.S. PATENT DOCUMENTS

| 5,422,750 A | * | 6/1995 | Kodera et al. ............... 349/126 |
| 5,455,695 A | * | 10/1995 | Kodera et al. ............... 349/126 |
| 5,712,696 A | * | 1/1998 | Toko et al. .................. 349/123 |

* cited by examiner

*Primary Examiner*—Toan Ton
(74) *Attorney, Agent, or Firm*—J.C. Patents

(57) ABSTRACT

The invention provides an apparatus and a method for rubbing the alignment layer in the LCD substrate. The rubbing apparatus of the present invention further includes a conditioning roller, in addition to the rubbing roller, to rejuvenate the rubbing roller in real time so as to lengthen the roller lifetime in the rubbing process and increase the rubbing rate. By employing the conditioning roller along with the rubbing roller, the rubbing process includes an extra conditioning step for conditioning the rubbing roller, thus shortening the production cycle time and increasing the throughput.

5 Claims, 3 Drawing Sheets

METHOD FOR RUBBING LCD SUBSTRATE

CROSS-REFERENCE TO RELATED APPLICATION

This application is a divisional application of, and claims the priority benefit of, U.S. application Ser. No. 10/065,976 filed on Dec. 5, 2002 now abandoned.

BACKGROUND OF THE INVENTION

1. Field of Invention

The present invention relates to an apparatus and a method for rubbing liquid crystal display (LCD) substrates. More particularly, the present invention relates to an apparatus and a method for rubbing the alignment layer in the LCD substrate.

2. Description of Related Art

The cathode ray tube (CRT) has dominated our desktops and living rooms for half a century as the standard display for monitors. However, the CRT is now facing real competition in the form of monitors or display panels based on liquid crystal displays (LCDs).

Most of the LCD devices using electro-optical effects of liquid crystals as a light modulator, such as the twisted nematic (TN)-effect and the in-plane switching (IPS)-effect for thin film transistor liquid crystal displays (TFT LCDs). The most common LCD in use today is TFT-LCD, having a sandwich-like structure with liquid crystal filled between two glass plates.

The liquid crystal is the material that possesses properties of the liquid including fluidity and the solid including long-range order at the same time. Liquid crystal molecules have unique structures in a bar shape, and they have the anisotropic characteristics.

Liquid crystal displays in use rely on pixels formed by liquid-crystal (LC) cells that change the polarization direction of light passing through them in response to an electrical voltage. The polarization orientation of the liquid crystal molecule is determined by the rubbing direction of the alignment layer.

Rubbing process is commonly used by most LCD manufacturers to forms the straight groove in a fixed direction on the hardened alignment layer, so that the liquid crystal molecules can align in the fixed direction. The rubbing process is performed through mechanical contact between the rubbing roller and the alignment layer. However, if the rubbing roller degrades unexpectedly or unevenly, the effect of a local defect on the alignment layer may not be detected until hundreds of flawed displays have been manufactured and subsequently discarded. Moreover, rubbing rate is deferred to a large extent by the poor conditions or instabilities of the rubbing roller. Therefore, it is in great demand to improve the rubbing roller or the present rubbing process, in order to increase reliability and enhance rubbing performance.

SUMMARY OF THE INVENTION

The invention provides an apparatus and a method for rubbing the alignment layer in the LCD substrate.

The present invention provides a rubbing process involving an additional conditioning step in the rubbing process to reduce rubbing defects and enhance the performance. The rubbing apparatus of the present invention further includes a conditioning roller, in addition to the rubbing roller, to rejuvenate the rubbing roller in real time so as to lengthen the roller lifetime in the rubbing process and increase the rubbing rate.

Therefore, the present invention provides the rubbing roller in combination with the conditioning roller, in order to improve rubbing quality and enhance rubbing performance. By employing the conditioning roller along with the rubbing roller, the rubbing process includes an extra conditioning step for conditioning the rubbing roller. The conditioning step can lengthen the lifetime of the rubbing roller, so that the rubbing roller do not have to be replaced too often, thus shortening the production cycle time and increasing the throughput.

As embodied and broadly described herein, the invention provides a rubbing apparatus, comprising: a platform, a conveyor, a based plate on the conveyor, a rubbing roller having a rubbing cloth on its surface above the base plate, a conditioning roller having a conditioning cloth on its surface aside to the rubbing roller and above the base plate. A plurality of first and second pile fibers are formed on surfaces of the rubbing cloth and the conditioning cloth respectively. The rubbing roller rotates in a first rotating direction opposite to a second rotating direction in which the conditioning roller rotates, and a predetermined distance is arranged between the rubbing roller and the conditioning roller, so that the second pile fibers of the conditioning cloth on the conditioning roller are in contact with the first pile fibers of the rubbing cloth on the rubbing roller, thereby rejuvenating the rubbing cloth on the rubbing roller.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Most LCDs, such as active-matrix LCD (AMLCD), currently on the market belong to the twisted nematic (TN) type that use linear polarizers to transmit or block light. Linear polarizers absorb (or block) light that is not polarized exactly in their orientation and pass all light that is in their orientation.

For the liquid crystal layer in the twisted state with no electric field applied, the light follows the twisted structure, resulting in a rotation of 90 degrees. It is because nematic liquid crystals 100 naturally order themselves in layers as shown in FIG. 1, the liquid crystal layers (acting like polarizers) changes the polarization of the light from axis A to axis B.

Figure 1:
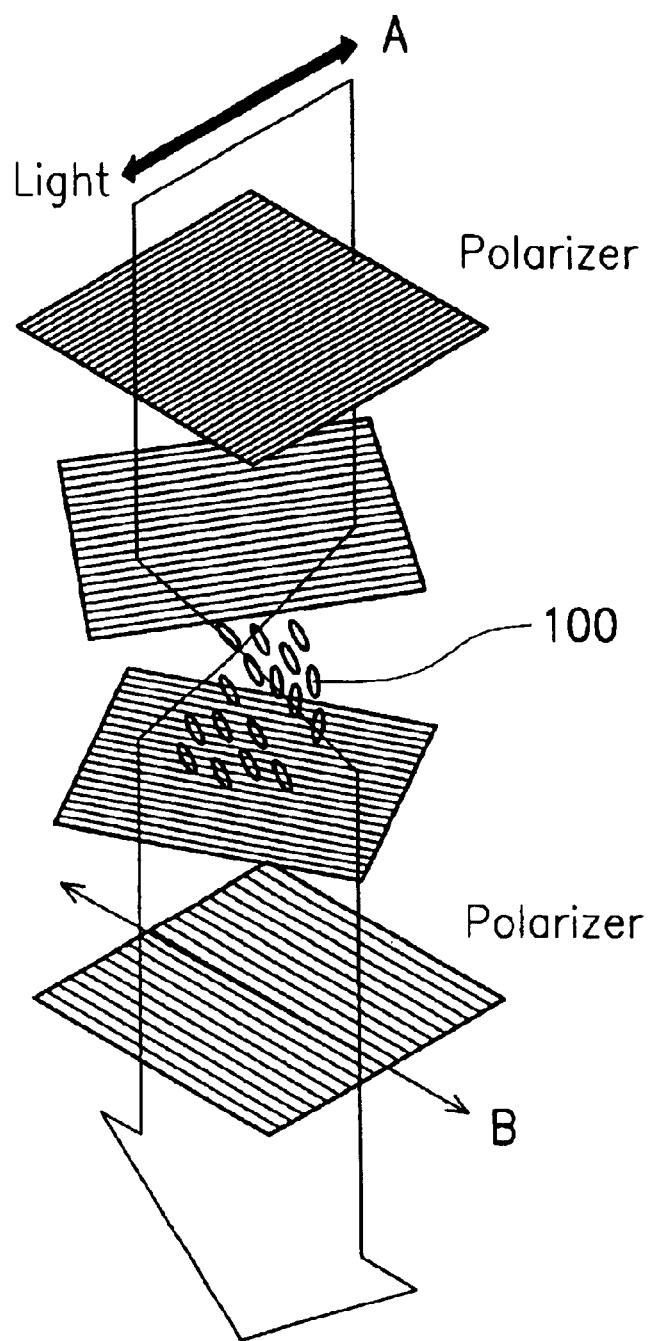
FIG. 1 shows the twisted structure of liquid crystal molecules in the liquid crystal layers.

The twisted structure shown in FIG. 1 is created when liquid crystal molecules in the liquid crystal layer are anchored (aligned) through a rubbing process. Generally, the flow of the LCD process can be described as follows: forming a alignment (orientation) layer on the lower and the upper plates respectively, positioning the alignment layer through the rubbing process so as to properly align the liquid crystals on the alignment layer, dispensing the spacer and assembling the two plates and then injecting the liquid crystal into the cell. A liquid crystal display device is formed by interposing liquid crystal molecules between a pair of substrate members, at least one of which transmits light. The pair of substrate members is obtained by forming a display electrode on a light transmitting substrate and thereafter forming an alignment layer on the substrate that contains the electrode. The alignment layer has a function of aligning the liquid crystal molecules in one direction. To provide for this function, a surface of the alignment film is rubbed by a rubbing apparatus.

Figure 2A:
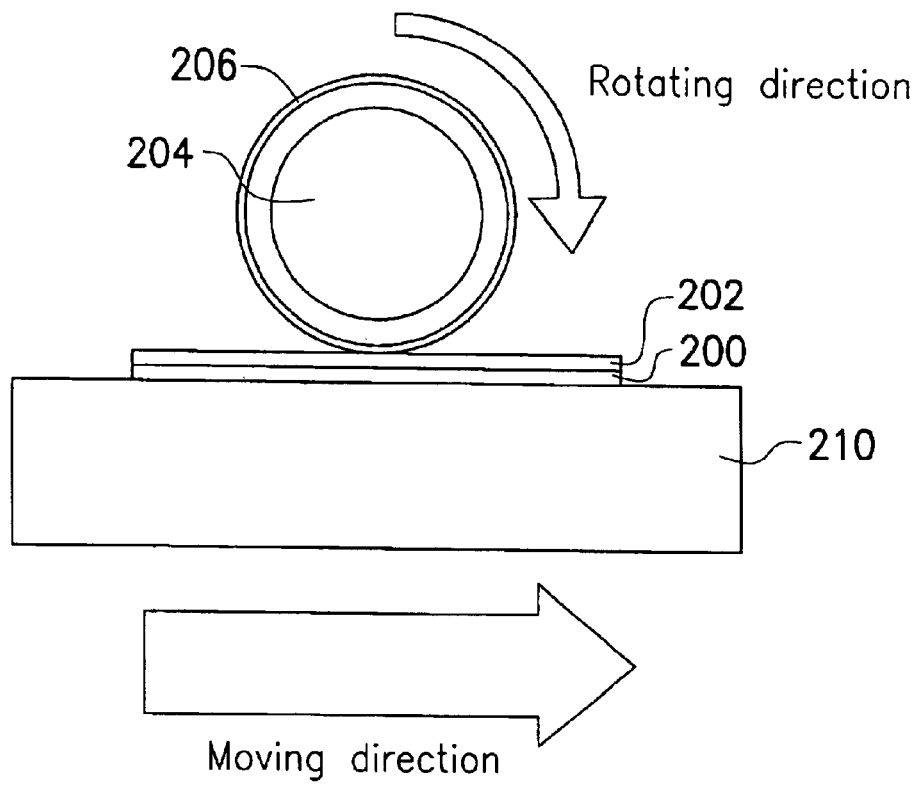
FIG. 2A is a schematic, display view for illustrating the rubbing process.

In the rubbing process, straight grooves are formed in the alignment layer in a fixed direction, so that the liquid crystal molecules can align in the pretilt direction. The rubbing process is performed through mechanical contact between the rubbing roller and the alignment layer. FIG. 2A illustrates the general concept for the rubbing process. The rubbing process is performed to an alignment layer 202 coated on a surface of a LCD substrate 200. For example, a material of the alignment layer includes polyimide (PI) or poly amic acids (PA), while a material for the substrate comprises glass. In the rubbing process, the LCD substrate 200, which is mounted on a moving base plate 210, passes under a rubbing roller 204 and a rubbing cloth 206 coated on the rubbing roller 204 rubs the alignment layer 202. The rubbing roller 204 is usually a rotating drum made of aluminum and coated with the rubbing cloth 206. The base plate 210 is moved by an underlying conveyor (not shown). Several materials can be used to fabricate the rubbing cloth 206, including rayon, cotton or nylon. The rubbing cloth is a cloth similar to velvet, having a piled surface (i.e. having a lot of short pile fibers). It is essential for the rubbing cloth to have high-density, uniform pile fibers on the surface, which are not easily shed.

Figure 2B:
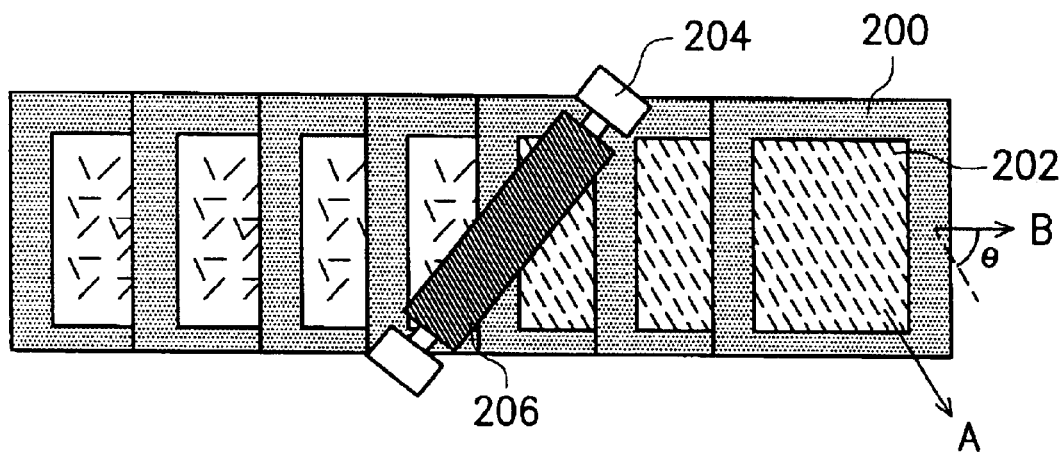
FIG. 2B is a top view showing the moving direction and the rubbing direction for the rubbing process.

Rubbing the surface of the alignment layer provides the energy necessary for holding the liquid crystal in its twisted state, thus resulting in the surface alignment of the liquid crystals along the rubbing direction. The exaggerated lines shown in FIG. 2B represent the grooves formed by rubbing parallel to the (rubbing) direction A in which the alignment layer is rubbed. Without the effect of rubbing, the liquid crystal molecules may reorient themselves in a random fashion, as shown in FIG. 2B left to the rubbing roller 204 (before rubbing).

Usually, there is a pretilt angle θ between the direction the alignment layer is rubbed (i.e. the rubbing direction) and the moving direction of the alignment layer. As shown in FIG. 2B, the pretilt angle θ between the rubbing direction A and the moving direction B of the alignment layer is between 0–90 degrees, preferably about 45 degrees. Nonetheless, in an STN (super-twisted nematic) liquid crystal display device, for instance, liquid crystal molecules are aligned as they are twisted in the range of 180 degrees or larger, e.g., 210 to 260 degrees, between the substrate members. The pretilt angle θ is adjustable dependent on the materials of the alignment layers or product requirements. In the rubbing process, many parameters have to be considered to control the pretilt angle and to determine the rubbing strength, including the rubbing speed and the down force of the roller, the moving speed of the base plate, rubbing times, and pile impression.

However, if the rubbing roller degrades unexpectedly or unevenly, it will cause undesired defects in the alignment layer, thus leading to flawed display. Most often the deterioration of the rubbing roller comes from the rubbing cloth. That is, the pile on the surface of the rubbing cloth becomes pressed or deflated. In order to prevent local defects on the alignment layer by the degraded roller, it is necessary to rejuvenate or restore the rubbing roller before it deteriorates severely.

Figure 3:
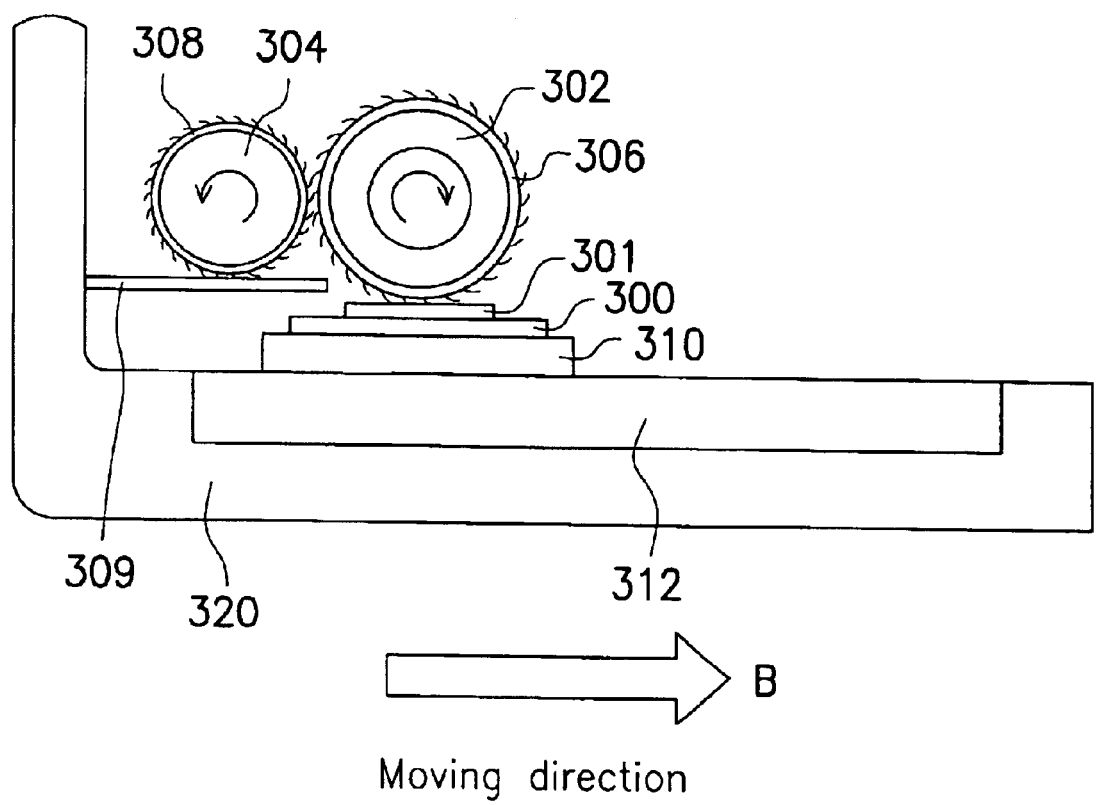
FIG. 3 is a schematic, display view for illustrating employing the rubbing roller along with the conditioning roller in the rubbing process according to one preferred embodiment of the present invention.

Therefore, the present invention provides a rubbing process involving an additional conditioning step in the rubbing process to enhance the performance. The rubbing apparatus of the present invention further includes a conditioning roller, in addition to the rubbing roller. FIG. 3 illustrates the rubbing roller incorporating the conditioning roller employing in the rubbing process according to one preferred embodiment of the present invention.

The rubbing process is performed by pressing a cylindrical rubbing roller on the alignment layer on the substrate at a prescribed pressure and moving the substrate in a predetermined direction (i.e. the rubbing direction), while rotating the rubbing roller. The rubbing process is performed to a substrate 300 mounted on a moving base plate 310. The base plate 310 is disposed on a conveyor 312, while the conveyor 312 is arranged in a platform 320. In the platform 320, the base plate 310 serves to carry the substrate 300 and the conveyor 312 arranged under the base plate 310 serves to move the base plate 310. The conveyor 312 can move the substrate 300 along the moving direction B to a predetermined location or levelly rotate the substrate 300 to adjust the pretilt angle. The substrate 300 includes an alignment layer 301. Various materials can be used to form the alignment layer for different LCD substrates. The substrate 300, moving by the conveyor 312, moves under a rubbing roller 302 coated with a rubbing cloth 306. As shown in FIG. 3, a conditioning roller 304 is arranged aside to the rubbing roller 302, so that the rubbing roller 302 is conditioned by contacting its surface with the conditioning roller 304. An exhaust cover plate 309 is arranged under the conditioning roller 304 and above the substrate 300, to prevent the conditioning roller 304 in contact with the underlying substrate 300. The rubbing roller 302, the conditioning roller 304 and the exhaust cover plate 309 are connected to or fixed to the platform 320. By employing the conditioning roller along with the rubbing roller, the rubbing process includes an extra conditioning step.

The conditioning roller 304 is a powered rotating roller, rotating in a direction opposite to the rotating direction of the rubbing roller 302. That is, if the conditioning roller 304 rotates clockwise, the rubbing roller 302 rotates counterclockwise, and vices versa. The rotating speeds of both the rubbing roller 302 and the conditioning roller 304 can be adjusted, depending on the levels of conditioning. Preferably, the rotating speed of the conditioning roller 304 is faster than that of the rubbing roller 302. The conditioning roller 304 is similar to the rubbing roller 302, a rotating drum made of aluminum and coated with a conditioning cloth 308. Likewise, several materials can be used to fabricate the conditioning cloth 308, including rayon, cotton or nylon, depending on the process requirements. The conditioning cloth is a cloth similar to the rubbing cloth, having a piled surface (i.e. having a lot of short pile fibers). A predetermined distance is arranged between the rubbing roller and the conditioning roller, so that the pile fibers on the conditioning cloth are in touch with the pile fibers on the rubbing cloth. Because the conditioning roller 304 rotates in an opposite direction to the rotating direction of the rubbing roller 302, the conditioning cloth 308 coated on the conditioning roller 304 can rejuvenate the surface of the rubbing cloth 306 on the rubbing roller 302. Through pile contacts between the conditioning cloth and the rubbing cloth, the pile on the surface of the rubbing cloth is reset (or tuned) to the original (desired) conditions.

The positions of both the conditioning and the rubbing rollers can be adjusted in order to change the distance between the conditioning roller and the rubbing roller. The conditioning roller is either swept across the surface of the rubbing roller in a controlled manner, or is of sufficient dimension to condition the entire surface of the rubbing roller where it is in contact with the substrate. Conditioning may be performed in situ (while the substrate is being rubbed), ex situ (between substrates), or combination of both. The manner in which the rubbing roller is conditioned corresponds to the wear level of the rubbing roller.

The present invention can further provides a liquid crystal display (LCD) device and a method for manufacturing the LCD device thereof by employing the rubbing apparatus or the rubbing process of the present invention. Such LCD device comprising: a pair of substrate members, at least either one of the pair of substrate members being capable of transmitting light, and a liquid crystal disposed between the pair of substrate members. At least either one of the substrate members includes an alignment layer which is rubbed using a rubbing apparatus comprising: a rubbing roller having a rubbing cloth on a surface of the rubbing roller, wherein a surface of the rubbing cloth has a plurality of first pile fibers, wherein the rubbing roller to be moved together with the substrate member in relation to each other to thereby perform rubbing to the alignment layer; and a conditioning roller arranged aside to the rubbing roller, having a conditioning cloth on a surface of the conditioning roller, wherein a surface of the conditioning cloth has a plurality of second pile fibers. The rubbing roller rotates in a first rotating direction opposite to a second rotating direction in which the conditioning roller rotates, and a predetermined distance is arranged between the rubbing roller and the conditioning roller, so that the second pile fibers of the conditioning cloth on the conditioning roller are in contact with the first pile fibers of the rubbing cloth on the rubbing roller.

Generally, instabilities or deterioration in the rubbing roller directly leads to poor rubbing performance or faulty rubbing. In this case, conditioning helps rejuvenating the rubbing roller, thus reducing rubbing defects and enhancing the rubbing performance. Moreover, since failure of the rubbing roller is a primary cause of rubbing rate decay, conditioning of the rubbing roller can help lengthen the roller lifetime in the rubbing process and increase the rubbing rate.

Therefore, the present invention provides the rubbing roller in combination with the conditioning roller, in order to improve rubbing quality and enhance rubbing performance. By employing the conditioning roller along with the rubbing roller, the rubbing process includes an extra conditioning step for conditioning the rubbing roller. The conditioning step can lengthen the lifetime of the rubbing roller, so that the rubbing roller do not have to be replaced too often, thus shortening the production cycle time and increasing the throughput.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a liquid crystal display device, said method comprising:

a first step of transporting a liquid crystal display substrate under a rubbing apparatus comprising a rotated rubbing roller and a rotating conditioning roller arranged aside to the rubbing roller, the liquid crystal display substrate having an alignment layer thereon, the rubbing roller having a rubbing cloth on a surface of the rubbing roller, wherein a surface of the rubbing cloth has a plurality of first pile fibers, so that the alignment layer is rubbed by the first pile fibers during rotation of the rubbing roller, the conditioning roller having a conditioning cloth on a surface of the conditioning roller, wherein a surface of the conditioning cloth has a plurality of second pile fibers, so that the second pile fibers of the conditioning cloth on the conditioning roller are in contact with the first pile fibers of the rubbing cloth on the rubbing roller, and wherein the rubbing roller rotates in a first rotating direction opposite to a second rotating direction in which the conditioning roller rotates;

a second step of binding a pair of substrates to each other, at least one of the pair of substrates having gone through rubbing in the first step; and a third step of injecting liquid crystal between the substrates.

2. The method of claim 1, wherein if the conditioning roller rotates clockwise, the rubbing roller rotates counter-clockwise.

3. The method of claim 1, wherein if the conditioning roller rotates counter-clockwise, the rubbing roller rotates clockwise.

4. The method of claim 1, wherein the second rotating speed of the conditioning roller is faster than the first rotating speed of the rubbing roller.

5. The method of claim 1, wherein the rubbing apparatus further comprises a cover plate under the conditioning roller and above the liquid crystal display substrate to prevent the conditioning roller in contact with the substrate.

* * * * *